United States Patent
Zhang

(10) Patent No.: US 12,386,574 B2
(45) Date of Patent: Aug. 12, 2025

(54) METHOD AND DEVICE OF CONTROLLING DISPLAY OF TERMINAL INFORMATION, TERMINAL, AND STORAGE MEDIUM

(71) Applicant: GUANGDONG OPPO MOBILE TELECOMMUNICATIONS CORP., LTD., Guangdong (CN)

(72) Inventor: Kun Zhang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 17 days.

(21) Appl. No.: 18/324,925

(22) Filed: May 26, 2023

(65) Prior Publication Data

US 2024/0118851 A1 Apr. 11, 2024

Related U.S. Application Data

(63) Continuation of application No. PCT/CN2021/117148, filed on Sep. 8, 2021.

(30) Foreign Application Priority Data

Nov. 27, 2020 (CN) .......................... 202011368608.1

(51) Int. Cl.
*G06F 3/0484* (2022.01)
*G06F 3/14* (2006.01)
(Continued)

(52) U.S. Cl.
CPC .............. *G06F 3/14* (2013.01); *G06F 3/0484* (2013.01); *G06F 16/9535* (2019.01);
(Continued)

(58) Field of Classification Search
CPC .................................................. G06F 3/048–05
See application file for complete search history.

(56) References Cited

U.S. PATENT DOCUMENTS

| 2010/0262673 A1* | 10/2010 | Chang | H04L 67/141 |
| | | | 715/764 |
| 2013/0252637 A1* | 9/2013 | Cha | H04W 4/021 |
| | | | 455/456.3 |

(Continued)

FOREIGN PATENT DOCUMENTS

| CN | 107590290 A | 1/2018 |
| CN | 109543099 A | 3/2019 |

(Continued)

OTHER PUBLICATIONS

English Translation of CN-111143683-A published on May 12, 2020, 17 pages (Year: 2020).*

(Continued)

*Primary Examiner* — Daniel Rodriguez
(74) *Attorney, Agent, or Firm* — Ladas & Parry, LLP

(57) ABSTRACT

Provided are a method and a device of controlling display of terminal information, a terminal, and a storage medium. The method includes: obtaining (S10) device information of a device that accesses a terminal; determining (S20) target recommendation information based on the device information, wherein the target recommendation information is recommendation information corresponding to the device that currently accesses the terminal; and displaying (S30) the target recommendation information in a recommendation area in a display area of the terminal, wherein different recommendation areas correspondingly display different target recommendation information.

18 Claims, 15 Drawing Sheets

(51) Int. Cl.
  *G06F 16/9535* (2019.01)
  *G06F 16/9538* (2019.01)
  *G06F 21/31* (2013.01)
  *G06V 20/60* (2022.01)
(52) U.S. Cl.
  CPC .......... *G06F 16/9538* (2019.01); *G06F 21/31* (2013.01); *G06V 20/60* (2022.01)

(56) References Cited

U.S. PATENT DOCUMENTS

| | | | | |
|---|---|---|---|---|
| 2014/0181656 | A1* | 6/2014 | Kumar | H04L 12/6418 715/716 |
| 2014/0258926 | A1* | 9/2014 | Min | G06F 3/04817 715/810 |
| 2014/0369519 | A1* | 12/2014 | Leschka | G06F 16/683 381/74 |
| 2015/0046968 | A1* | 2/2015 | Lee | H04N 21/8173 725/132 |
| 2016/0360336 | A1* | 12/2016 | Gross | H04W 4/025 |
| 2019/0018886 | A1* | 1/2019 | Huang | H04M 1/72412 |
| 2019/0065018 | A1* | 2/2019 | Keam | G06F 3/041 |
| 2019/0266592 | A1* | 8/2019 | Shen | G06Q 20/4014 |
| 2021/0144780 | A1* | 5/2021 | Hao | H04W 4/80 |

FOREIGN PATENT DOCUMENTS

| | | | | |
|---|---|---|---|---|
| CN | 109842806 | A | | 6/2019 |
| CN | 110475012 | A | | 11/2019 |
| CN | 111143683 | A * | 5/2020 | ......... G06F 16/9535 |
| CN | 112364249 | A | | 2/2021 |
| CN | 109842806 | B | | 9/2021 |

OTHER PUBLICATIONS

European Search Report, European Application No. 21896468.2, mailed May 10, 2024 (146 pages).
Chinese First Office Action and search report for the corresponding Chinese patent Application No. 202011368608.1 issued by the Chinese Patent Office on Jul. 22, 2023, and its English translation provided by the foreign associate.
International search report (ISR) dated Dec. 2, 2021 for Application No. PCT/CN2021/117148 and its English translation provided by WIPO.
Written Opinion (WOSA) dated Dec. 2, 2021 for Application No. PCT/CN2021/117148 and its English translation provided by WIPO.

* cited by examiner

S20 includes at least one of the following when the recommendation area is a first area, a target application recommendation information is determined based on the device information. The application recommendation information corresponds to a usage history of an application used by the user of the terminal — S60 when the recommendation area is a second area, the target application recommendation information is determined based on the device information. The application recommendation information corresponds to the usage history of the application used by the user of the terminal — S70 when the recommendation area is a third area, the target operation recommendation information is determined based on the device information. The operation recommendation information corresponds to an operation history performed by the user of the terminal — S80

FIG. 6 when the recommendation area is the second recommendation area, the target application recommendation information is determined from all applications supported by the terminal based on the device information. The target application information is loaded in different interfaces of the terminal before being generated — S71

Device is a new device
Automatically connected-earphone | Automatically connected-TV
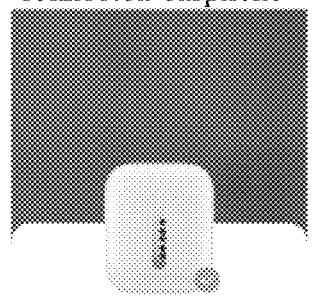
New device has been added
** earphone
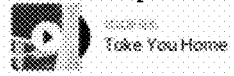
Setting **** Pods
FIG. 16-1
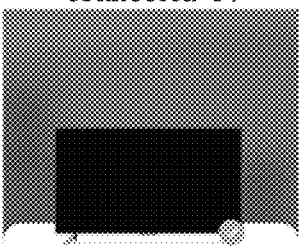
New device has been added
** TV
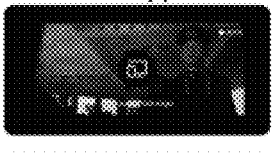
Remote control by mobile phone
FIG. 16-2
FIG. 16

Device belongs to a person other than the user of the terminal
| earphone | TV | Page layout |
|---|---|---|
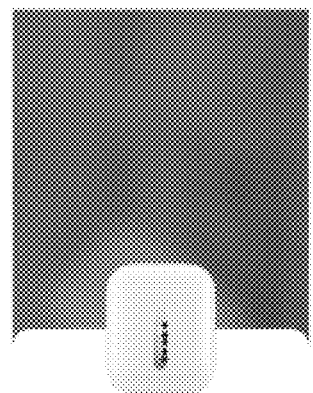 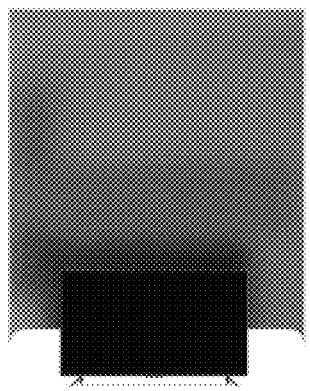 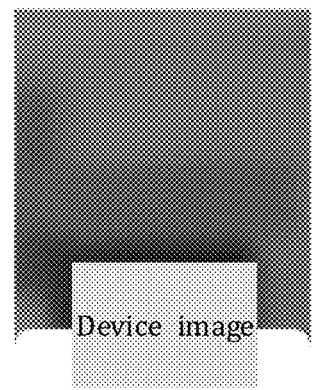
| xxx's earphone<br>* Pods | xxx's TV<br>* TV | xxx's device<br>*** device |
|---|---|---|
| Sending reminding msg indicating the earphone being lost | Sending comments | More operations |
| Connecting earphone | Remote control by mobile phone | More operations |
FIG. 17

Re-connecting device
Remind while connecting
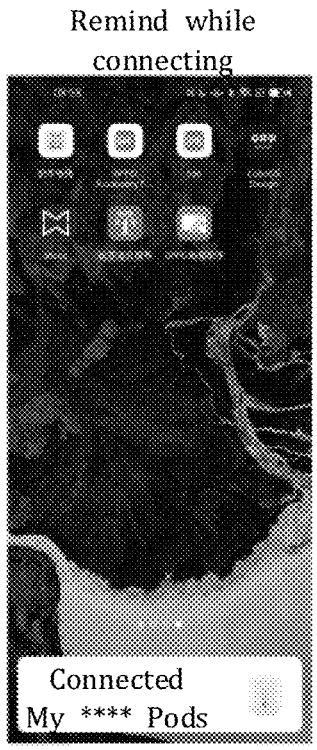
FIG. 18-1
Remind while connecting
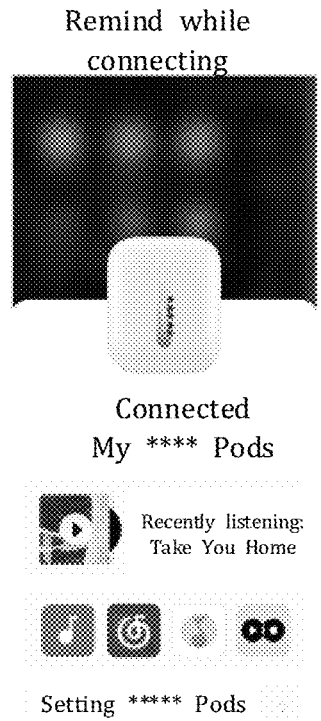
FIG. 18-2
FIG. 18
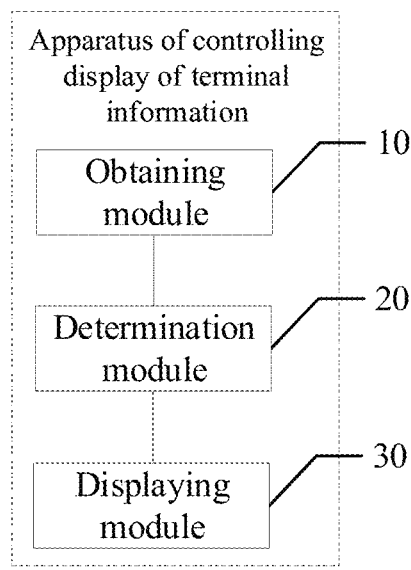
FIG. 19

METHOD AND DEVICE OF CONTROLLING DISPLAY OF TERMINAL INFORMATION, TERMINAL, AND STORAGE MEDIUM

CROSS REFERENCE TO RELATED APPLICATION

The present application is a continuation application of the International patent application No. PCT/CN2021/117148 filed on Sep. 8, 2021, which claims the priority of the Chinese patent application No. 202011368608.1, filed on Nov. 27, 2020 and the contents of which are incorporated herein by reference in their entireties.

TECHNICAL FIELD

The present disclosure relates to the field of computers, and in particular to a method and a device of controlling display of terminal information, a terminal, and a storage medium.

BACKGROUND

As mobile communication technology develops, and as smart phones are popular to users, more and more users access various information through the mobile phones. Various software on mobile phones allows the mobile phones to have more functions and to enrich our daily lives.

SUMMARY OF THE DISCLOSURE

The present disclosure provides a method and a device of controlling display of terminal information, a terminal, and a storage medium. When a device accesses a terminal, recommendation information in a phone is automatically generated based on information of the accessing device, and recommendation information corresponding to the device information is generated and automatically displayed in a recommendation area, facilitating user's operations.

In an aspect, a method of controlling display of terminal information is provided and includes:
  obtaining device information of a device that accesses a terminal;
  determining target recommendation information based on the device information, wherein the target recommendation information is recommendation information corresponding to the device that currently accesses the terminal; and
  displaying the target recommendation information in a recommendation area in a display area of the terminal, wherein different recommendation areas correspondingly display different target recommendation information.

In another aspect, an apparatus of controlling display of terminal information is provided and includes an obtaining module, a determination module, and a displaying module.

The obtaining module is configured to obtain device information of a device that accesses a terminal.

The determination module is configured to determine target recommendation information based on the device information, wherein the target recommendation information is recommendation information corresponding to the device that currently accesses the terminal.

The displaying module is configured to display the target recommendation information in a recommendation area in a display area of the terminal, wherein different recommendation areas correspondingly display different target recommendation information.

In still another aspect, a terminal is provided and includes a memory, a processor and a computer program stored in the memory and runnable on the processor. The processor is configured to execute the computer program to perform operations of:
  obtaining device information of a device that accesses a terminal;
  determining target recommendation information based on the device information, wherein the target recommendation information is recommendation information corresponding to the device that currently accesses the terminal; and
  displaying the target recommendation information in a recommendation area in a display area of the terminal, wherein different recommendation areas correspondingly display different target recommendation information.

In still another aspect, a computer readable storage medium is provided. A computer program is stored in the computer readable storage medium, and the computer program is executed by a processor to perform operations of:
  obtaining device information of a device that accesses a terminal;
  determining target recommendation information based on the device information, wherein the target recommendation information is recommendation information corresponding to the device that currently accesses the terminal; and
  displaying the target recommendation information in a recommendation area in a display area of the terminal, wherein different recommendation areas correspondingly display different target recommendation information.

BRIEF DESCRIPTION OF THE DRAWINGS

FIG. 6 is a flow chart of determining target recommendation information according to the device information in the method of controlling display of terminal information according to another embodiment of the present disclosure, where the target recommendation information is recommendation information corresponding to a currently accessing device.

FIG. 16 is a schematic view of recommendation information of a device that accesses a terminal for a first time according to an embodiment of the present disclosure.

FIG. 17 is a schematic view of recommendation information of a device that accesses a terminal and is a device of a third party according to an embodiment of the present disclosure.

FIG. 18 is a schematic view of recommendation information of a device that has accessed the terminal previously according to an embodiment of the present disclosure.

FIG. 19 is a structural diagram of a device of controlling display of terminal information according to an embodiment of the present disclosure.

DETAILED DESCRIPTION

It should be understood that the specific embodiments described herein are intended to explain the present disclosure only and are not intended to limit the present disclosure.

According to the present disclosure, device information of a device that currently accesses a terminal is obtained; target recommendation information is determined based on the device information, where the target recommendation information is recommendation information corresponding to the device that currently accesses the terminal; the target recommendation information is displayed in a recommendation area in a display area of the terminal, where different recommendation areas display different target recommendation information correspondingly.

The terminal described in the present disclosure can be implemented in various forms. For example, the terminal may include a mobile terminal such as a mobile phone, a tablet, a laptop, a handheld computer, a personal digital assistant (PDA), a portable media player (PMP), a navigation device, a wearable device, a smart bracelet, a pedometer, and so on. Of course, the terminal may also be a terminal device in the broad sense, such as a device configured with a processor, including a TV, a vehicle-mounted device, and so on. The terminal may include a device that can be accessed by a device and can provide a displaying function.

Figure 1:
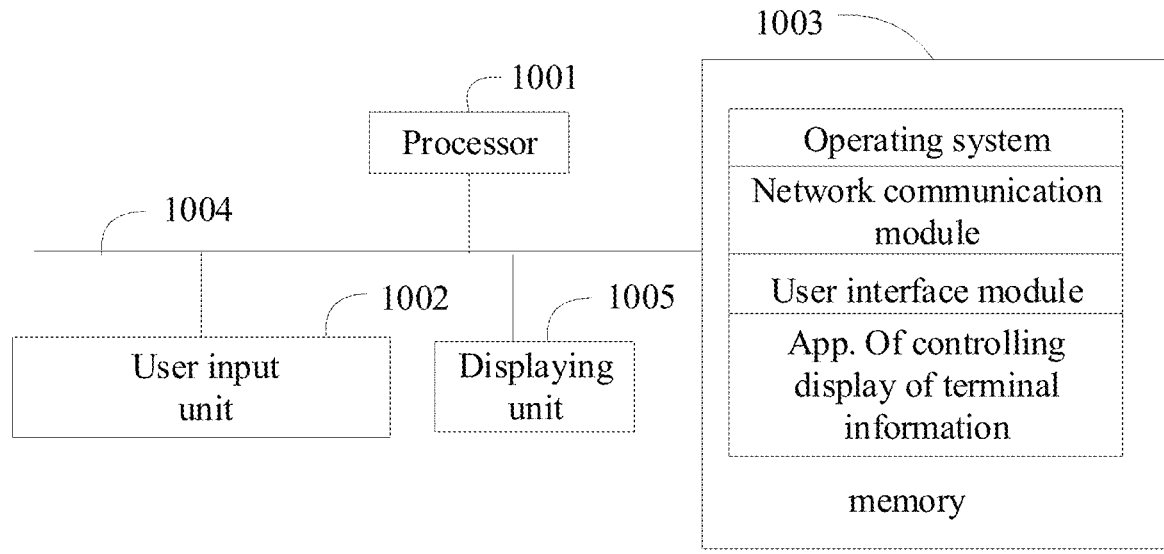
FIG. 1 is a structural schematic view of hardware of a terminal according to an embodiment of the present disclosure.

FIG. 1 is a structural schematic view of hardware of a terminal according to an embodiment of the present disclosure.

As shown in FIG. 1, taking the mobile terminal as an example, the mobile terminal may include: a processor 1001, such as a central processing unit (CPU), a memory 1003, a communication bus 1004, a user input unit 1002, and a display unit 1005. The communication bus 1004 is configured to achieve connection communication between the processor 1001 and the memory 1003. The memory 1003 may be a high-speed RAM memory or a stable memory (non-volatile memory), such as a disk memory. The memory 1003 may alternatively be a storage device independent of the processor 1001.

In some embodiments, the mobile terminal also includes at least one sensor, such as a light sensor, a motion sensor, and other sensors. An accelerometer sensor, as a motion sensor, may detect an acceleration in each direction (generally in each of three axes). When a device is at rest, the accelerometer sensor may detect a magnitude and a direction of the gravity and may be configured for applications that recognize a posture of the mobile phone (such as horizontal-vertical screen switching, related games, magnetometer posture calibration), for functions related to vibration recognition (such as pedometer, tapping), and so on. The mobile phone may further be configured with a fingerprint sensor, a pressure sensors, an iris sensor, a molecular sensor, a gyroscope, a barometer, a hygrometer, a thermometer, an infrared sensor, and so on, which will not be described in detail herein.

In some embodiments, the display unit 1005 is configured to display a message entered by or provided for a user. The display unit 1005 may include a display panel, which may be configured in the form of a liquid crystal display (LCD), an organic light-emitting diode (OLED), and so on.

In some embodiments, the user input unit 1002 may be configured to receive an input numeric or character message and to generate a key signal input relating to user settings and functional control of the mobile terminal. Specifically, the user input unit 1002 may include a touch panel and other input devices. The touch panel, also referred to as a touch screen, may collect a touch operation performed by the user on or near the touch screen (such as the operation performed on or near the touch panel by using any suitable object or attachment such as a finger, a stylus, and so on) and may drive a corresponding connected device according to a pre-defined program. In addition to the touch panel, the user input unit 1002 may further include other input devices. Specifically, the other input devices may include, but are not limited to, one or more of a physical keyboard, function keys (such as volume control buttons, switch buttons, and so on), a trackball, a mouse, an operating stick, and so on, which will not be limited herein.

In some embodiments, the processor 1001 is a control center of the mobile terminal and connects various parts of the entire mobile terminal using various interfaces and lines. The processor 1001 may perform various functions and process data of the mobile terminal by running or executing software programs and/or modules stored in the memory 1003 and by invoking data stored in the memory 1003, thereby monitoring the entire mobile terminal. The processor 1001 may include one or more processing units. In some embodiments, the processor 1001 may integrate an application processor and a modem processor. The application processor mainly processes an operating system, user interfaces, applications, and so on. It will be understood that the above modem processor may not be integrated into the processor 1001.

In some embodiments, the memory 1003 may be configured to store software programs and various data. The memory 1003 may include a program storage space and a data storage space. The program storage space may store the operating system, an application required for at least one function (such as for a sound playing function, an image displaying function, etc.), and so on. The data storage space may store data generated based on use of the mobile phone (such as audio data, contact list, and so on). In addition, the memory 1003 may include a high-speed random access memory, and may also include a non-volatile memory, such as at least one disk memory device, a flash memory device, or other volatile solid state memory devices.

Any ordinary skilled person in the art shall understand that a structure of the mobile terminal illustrated in FIG. 1 shall not limit the terminal, and the terminal may include more or fewer components than illustrated, or include a combination of certain components or components arranged in a different manner.

For the mobile terminal illustrated in FIG. 1, the processor 1001 is configured to execute an application of controlling display of terminal information to perform the following operations.

Device information of a device that currently accesses the terminal is obtained.

Target recommendation information is determined based on the device information. The target recommendation information is recommendation information corresponding to the device that currently accesses the terminal.

The target recommendation information is displayed in a recommendation area in a display area of the terminal. Different recommendation areas correspondingly display different target recommendation information.

Figure 2:
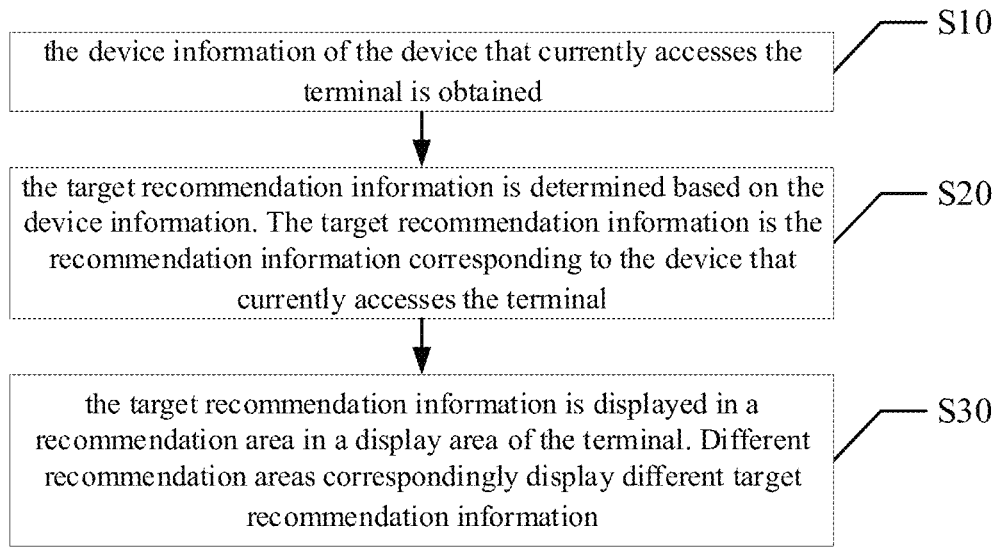
FIG. 2 is a flow chart of a method of controlling display of terminal information according to an embodiment of the present disclosure.

As shown in FIG. 2, FIG. 2 is a flow chart of a method of controlling display of terminal information according to an embodiment of the present disclosure. The method of controlling display of terminal information includes the following.

In an operation S10, the device information of the device that currently accesses the terminal is obtained.

The device that currently accesses the terminal include, but is not limited to, a device capable of accessing other devices, such as a mobile phone, headsets, a TV, and so on. The device information includes, but is not limited to, a type of the device, a model of the device, a user of the device (the user tagged by the device, such as, A's headsets, B's TV, dad's headsets, or mum's TV), and/or a manufacturer of the device. The user of the device herein may be a user logged into the device or a user binding to the device.

The device accesses the terminal via Bluetooth or a wireless network or a wired connection. A process of the access may refer to the terminal identifying the device and establishing connection with the device, and the device accessing the terminal.

Obtaining the device information of the device that currently accesses the terminal may be performed after the device has accessed the terminal. The device information carried in access information of the device may be obtained. Alternatively, the device information may be obtained by capturing image information of the device, and the device information may be obtained by recognizing the image information. Alternatively, the device information may be obtained by obtaining identifier information of the device, such as a QR code information or a barcode information of the device.

In an operation S20, the target recommendation information is determined based on the device information. The target recommendation information is the recommendation information corresponding to the device that currently accesses the terminal.

The recommendation information includes, but is not limited to, content recommendation information, application recommendation information, and/or operation recommendation information. The content recommendation information includes music playing recommendation information, video viewing recommendation information, and so on. The application recommendation information includes an application used or loaded by the terminal. The operation recommendation information includes a setting operation or providing an entry for the device to access, such as providing an entry for setting up headphones or providing an entry for the mobile phone to remotely control the TV, and so on.

Different devices have different recommendation information. The recommendation information displayed in a current recommendation area may not be recommendation information that matches the device that currently accesses the terminal. Therefore, after the device accesses the terminal, the recommendation information displayed in the display area of the terminal needs to be adjusted, or the target recommendation information needs to be determined, such that the target recommendation information that matches the device information of the device that currently accesses the terminal may be generated. For example, the target recommendation information may be recommendation information of music playing that matches headphones currently accessing the terminal, or may be recommendation information of movie playing that matches a TV currently accessing the terminal. The recommendation information is generated corresponding to the device that accesses the terminal, such that the recommendation information that is used by or can be used by the currently-accessing device may be displayed in the recommendation area. It is understood that the recommendation information may be updated based on situations or adjusted based on operations performed by the user, such that a library of the recommendation information may be updated continuously. The recommendation information may alternatively be recommendation information that is from the device currently accessing the terminal and is obtained and used by the terminal. The recommendation information may alternatively be recommendation information that is from the internet and requested by the terminal.

For different recommendation information, a displaying and arrangement pattern of various target recommendation information is generated based on usage. For example, a music playing application that is most recently used is placed at a front of a displaying sequence. Recommendation information of the music playing application is generated and included in the target recommendation information. For the headset, the most recently played music and the applicant that is most recently used to play the music are the target recommendation information. The "most recently" refers to a preset time period before the currently accessing device accesses the terminal, and the preset time period is 1 hour, 4 hours, or the like. The preset time period may be set dynamically rather than a fixed time period. The preset time period may be determined depending on the device, different time periods may be set for different devices. For example, the preset time period for the headsets may be 1 hour, and the preset time period for the TV may be 10 hours or more. A process of generating the target recommendation information includes reorganizing recommendation information that are originally available. That is, a displaying order and a priority level of each of various recommendation information that are originally available may be updated, and the various recommendation information that are originally available may be reorganized based on the updated displaying order and the updated priority level, such that recommendation information having different displaying orders and different displaying content may be generated. Of course, the process of generating the target recommendation information may also include a process of generating a new recommendation information, which is not available originally, based on the device information.

The generated target recommendation information includes, but is not limited to, one type of recommendation information. The target recommendation information includes content recommendation information, application recommendation information, and/or operation recommendation information.

In an operation S30, the target recommendation information is displayed in a recommendation area in a display area of the terminal. Different recommendation areas correspondingly display different target recommendation information.

The recommendation area includes, but is not limited to, one area, including a content recommendation area, an application recommendation area, and/or an operation recommendation area. After the target recommendation information for the device that currently accesses the terminal, the target recommendation information is displayed in the recommendation area. The recommendation area corresponds to the target recommendation information. That is, the target recommendation information is displayed in the corresponding recommendation area, and different recommendation areas correspond to different target recommendation information.

Figure 3:
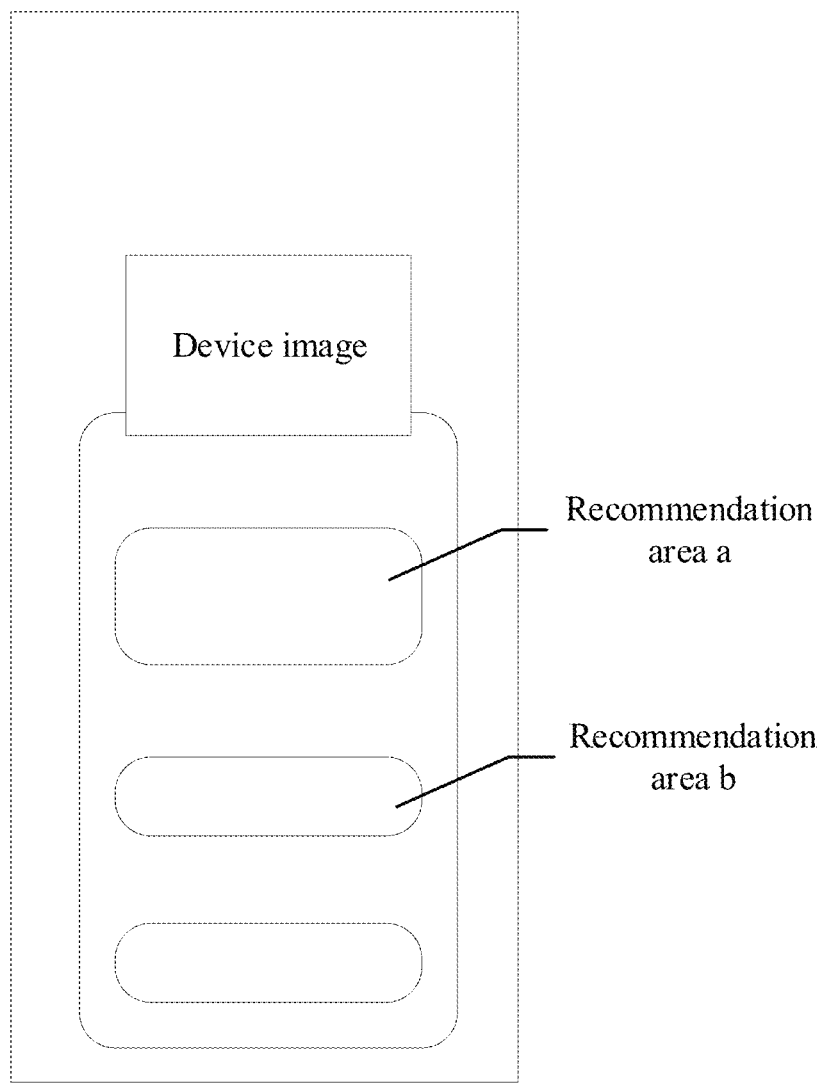
FIG. 3 is a schematic view of a recommended area in a method of controlling display of terminal information according to an embodiment of the present disclosure.
Figure 4:
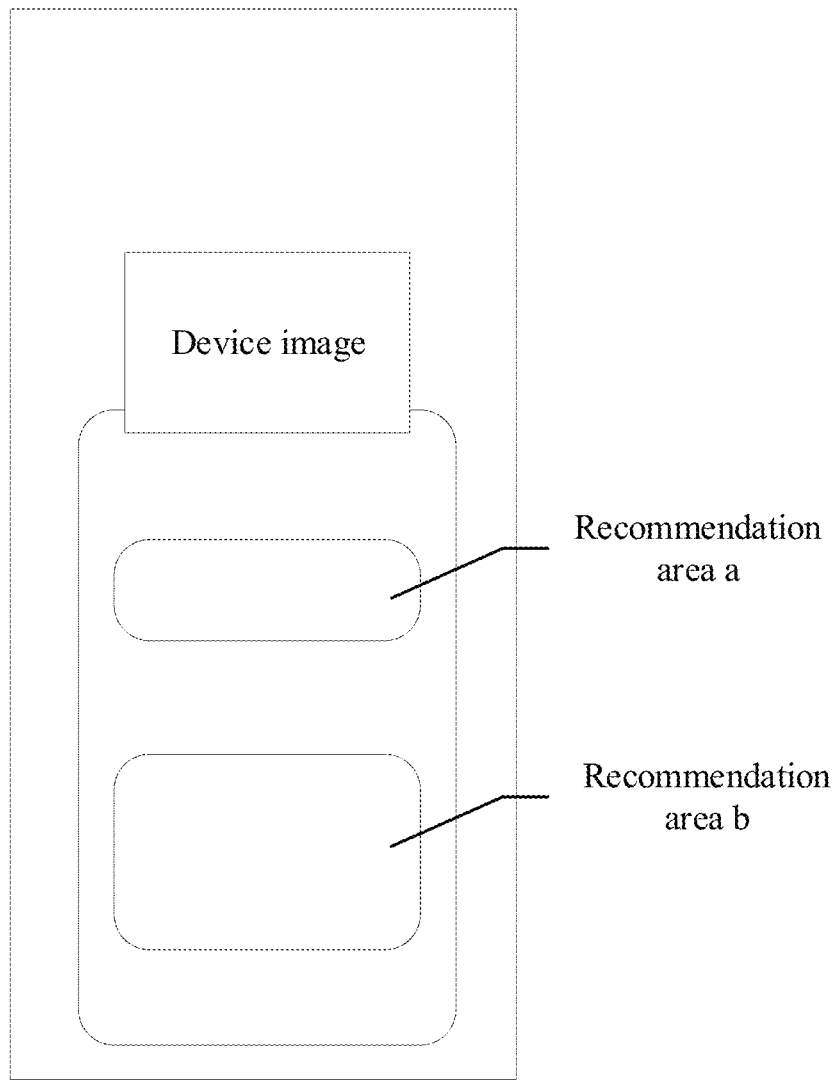
FIG. 4 is a schematic view of a recommended area in a method of controlling display of terminal information according to another embodiment of the present disclosure.

In an embodiment, when the number of the generated recommendation information is unequal to the number of recommendation areas, the number of recommendation areas may be adjusted to be equal to the number of the generated recommendation information. For example, when two types of recommendation information are generated to serve as two target recommendation information, only two recommendation areas are required to display the two types of recommendation information, and therefore, one recommendation area or three recommendation areas may be adjusted into two recommendation areas, and the two recommendation areas may display the two target recommendation information. When adjusting the recommendation areas, positions of the recommendation areas may be adjusted. Sizes and distribution of the recommendation areas may be adjusted based on the number of target recommendation information, examples are shown in FIG. 3 and FIG. 4. In FIG. 3, an area of a recommendation area a is larger than an area of a recommendation area b. In FIG. 4, the area of the recommendation area a is less than the area of the recommendation area b. The recommendation areas are adjusted based on the generated target recommendation information correspondingly.

In the present embodiment, while the device is accessing the terminal, the device information of the device that accesses the terminal is obtained. The target recommendation information is determined based on the device information, and the target recommendation information of the device that accesses the terminal is generated. The target recommendation information is displayed in the recommendation area of the terminal. In this way, the user may directly operate and control the device that accesses the terminal through the target recommendation information displayed in the recommendation area, such that the user may not need to search information related to the device that accesses the terminal to performing operating and controlling. The user may perform operations easily, improving intelligence of terminal operations.

Figure 5:
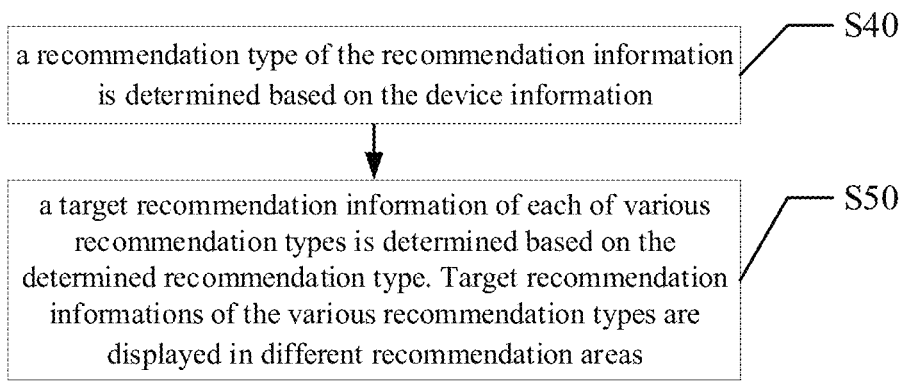
FIG. 5 is a flow chart of determining target recommendation information according to the device information in the method of controlling display of terminal information according to an embodiment of the present disclosure, where the target recommendation information is recommendation information corresponding to a currently accessing device.

In an embodiment, as shown in FIG. 5, determining the target recommendation information based on the device information may include the following operations.

In an operation S40, a recommendation type of the recommendation information is determined based on the device information.

In an operation S50, a target recommendation information of each of various recommendation types is determined based on the determined recommendation type. Target recommendation information of the various recommendation types are displayed in different recommendation areas.

Different devices may correspond to a same one recommendation information or different recommendation information, but generally, the corresponding recommendation information may be different from each other. After obtaining the device information of the device that accesses the terminal, the recommendation type of the recommendation information is determined based on the obtained device information. The recommendation type includes a music recommendation type/a video recommendation type/a setting recommendation type, or a control recommendation type, and so on. When the device is the headset, the recommendation type is the music recommendation type—music application recommendation type and a headset setting recommendation type. When the device is the TV, the recommendation type is the video recommendation type—video application recommendation type and the control recommendation type. Different devices correspond to different recommendation types. The recommendation type is determined based on the device information. Different recommendation areas correspond to different determined recommendation types. For example, the content recommendation area corresponds to content of the music recommendation type, the application recommendation area corresponds to content of the music application recommendation type, and the operation recommendation area corresponds to content of the headset setting recommendation type.

After determining the recommendation type, the target recommendation information of the recommendation type is determined based on the recommendation type, and the recommendation information related to the recommendation type is generated, and the target recommendation information is generated. Different types of target recommendation information are displayed in different recommendation areas. That is, different recommendation information are displayed in different recommendation areas.

In the present disclosure, when different devices access the terminal, different recommendation types are generated, such that accurate recommendation information can be displayed, further facilitating the user to perform operations.

In an embodiment, as shown in FIG. 6, determining the target recommendation information based on the device information may include at least one of the following.

In an operation S60, when the recommendation area is a first area, a target application recommendation information is determined based on the device information. The application recommendation information corresponds to a usage history of an application used by the user of the terminal.

In an operation S70, when the recommendation area is a second area, the target application recommendation information is determined based on the device information. The application recommendation information corresponds to the usage history of the application used by the user of the terminal.

Alternatively,
in an operation S80, when the recommendation area is a third area, the target operation recommendation information is determined based on the device information. The operation recommendation information corresponds to an operation history performed by the user of the terminal.

Figures 7, 8:
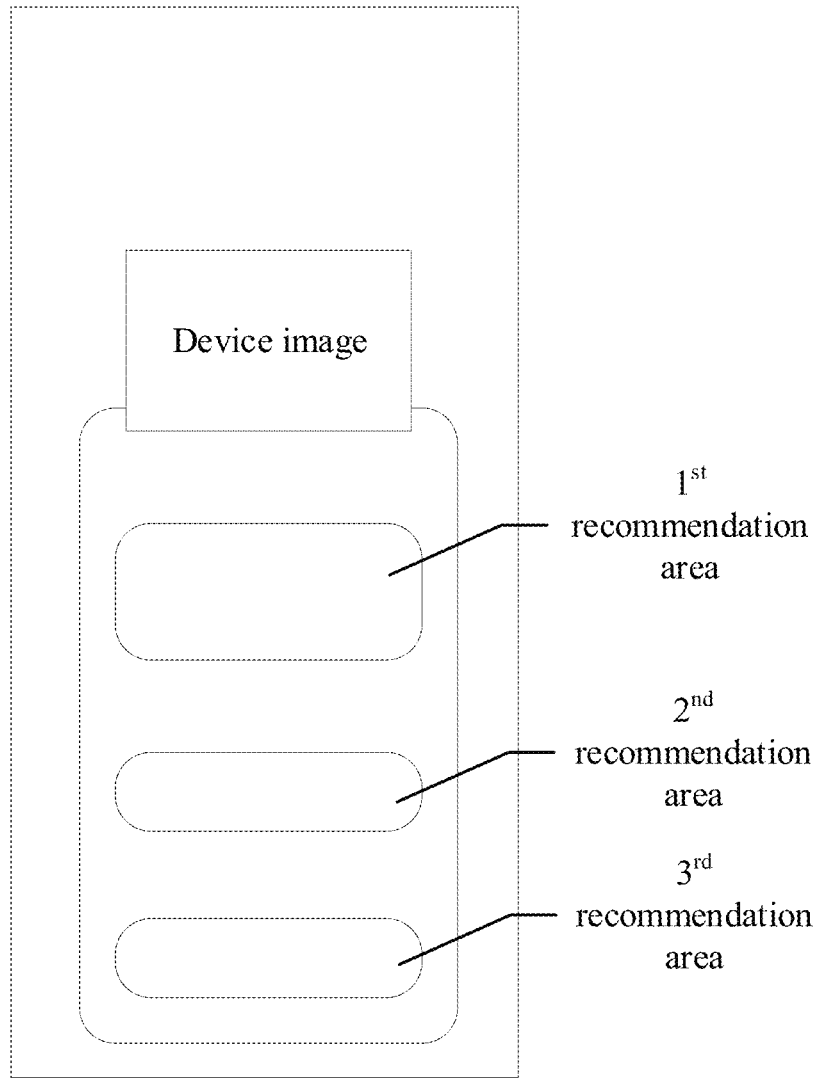
FIG. 7 is a schematic view of a recommendation information displaying page of the method of controlling display of terminal information according to an embodiment of the present disclosure.
FIG. 8 is a flow chart of determining, when the recommendation area is the second area, target recommendation information according to the device information in the method of controlling display of terminal information according to an embodiment of the present disclosure.

In this embodiment, the recommendation area is divided into various recommendation areas. Different recommendation areas correspond to different recommendation contents, and the different recommendation contents are obtained by calculation in different ways. The first recommendation area corresponds to a content browsing history of the user of the terminal. The second recommendation area corresponds to the usage history of the application used by the user of the terminal. The third recommendation area corresponds to the operation history performed by the user of the terminal. A page layout of the first recommendation area, the second recommendation area, the third recommendation area, and recommendation information corresponding to the three recommendation areas is shown in FIG. 7. The content browsing history of the user of the terminal includes at least one of a music browsing history, a video browsing history or a web browsing history. The usage history of the application used by the user of the terminal includes a usage history of any downloaded application, a usage history of a music application, a usage history of a video playing application, or a usage history of an information browsing application (such as a novel application, a news application, etc.). The operation history performed by the user of the terminal includes at least one of a headset setting history or a mobile phone remote control history. It can be understood that different generating manners are applied for different recommendation areas. The recommendation information is generated correspondingly based on the history and the device information of the device that accesses the terminal, and recommendation information in different recommendation areas may be generated, and the recommendation information are displayed in the different recommendation areas. In this way, the recommendation information can be quickly found in the corresponding recommendation area to operate the device that accesses the terminal, and operations of setting and connecting the device can be completed.

In this embodiment, different recommendation information are generated in different recommendation areas, different ways of generating the recommendation information are applied to the different recommendation areas. Histories performed by the user are combined, related to the user's personalized needs, such that the displayed recommendation information may be more accurate, meeting the user's needs and allowing the operations to be performed easily.

In an embodiment, as shown in FIG. 8, when the recommendation area is the second area, determining the target application recommendation information based on the device information includes the following.

In an operation S71, when the recommendation area is the second recommendation area, the target application recommendation information is determined from all applications supported by the terminal based on the device information. The target application information is loaded in different interfaces of the terminal before being generated.

When the recommendation area is the second recommendation area, the application recommendation information is required to be displayed in the second recommendation area. The generated recommendation information is an application supported by the terminal. All applications supported by the terminal are previously distributed in various interfaces, instead of being concentrated. The application supported by the terminal refers to an application that can be currently used by the terminal, such as a downloaded application. A prompt may be made by the application supported by the terminal, such that the user may not need to manually search an application which is not downloaded or not supported by the terminal.

In this embodiment, the application supported by the terminal can be generated based on usage of the device information, such that the user who is operating the terminal may use the application directly, without manually searching a relevant application to operate and use.

Figure 9:
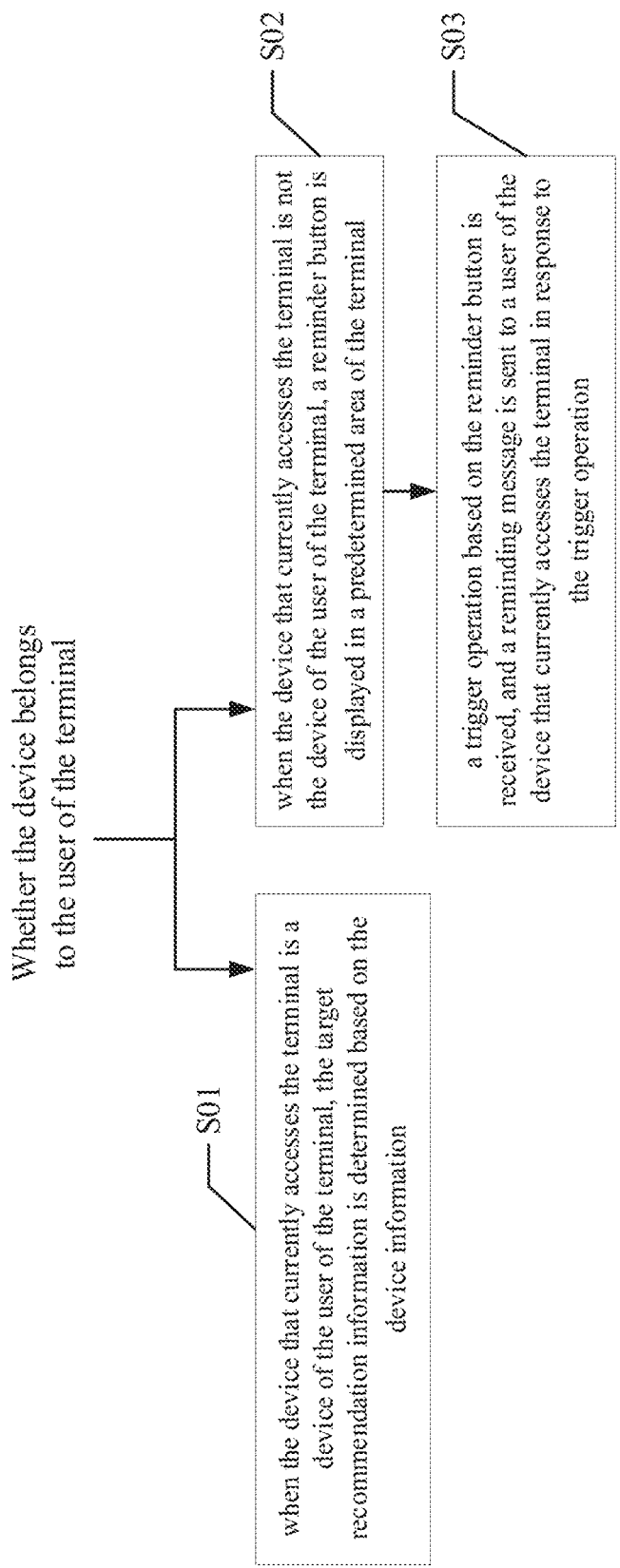
FIG. 9 is a flow chart of a method of controlling display of terminal information according to still another embodiment of the present disclosure.

In an embodiment, as shown in FIG. 9, after the device information of the device that accesses the terminal is obtained, the method further includes the following:

In an operation S01, when the device that currently accesses the terminal is a device of the user of the terminal, the target recommendation information is determined based on the device information, and the target recommendation information is the recommendation information corresponding to the device that currently accesses the terminal.

In an operation S02, when the device that currently accesses the terminal is not the device of the user of the terminal, a reminder button is displayed in a predetermined area of the terminal.

In an operation S03, a trigger operation based on the reminder button is received, and a reminding message is sent to a user of the device that currently accesses the terminal in response to the trigger operation.

Figure 10:
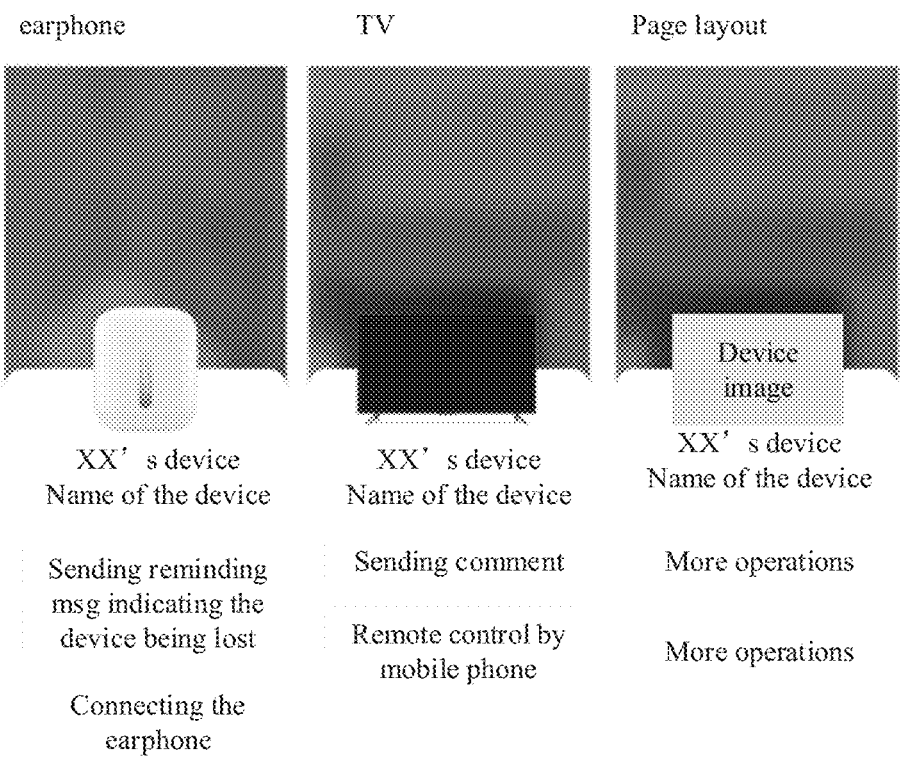
FIG. 10 is a schematic view of the recommendation area and recommendation information in the displaying page when various devices are accessing the terminal, according to an embodiment of the present disclosure.

The device that currently accesses the terminal is identified. That is, it is identified whether the device belongs to the user of the accessed terminal. When the device that currently accesses the terminal belongs to the user of the accessed terminal, the target recommendation information of the terminal is generated based on the device information, and the target recommendation information is the recommendation information corresponding to the device that currently accesses the terminal. When the device that currently accesses the terminal does not belong to the user of the accessed terminal, the device may be someone else's device, a device lost by another person, or a device borrowed from another person. The reminder button is displayed in the predetermined area of the terminal. The trigger operation based on the reminder button is received. The reminding message is sent to the user of the device that currently accesses the terminal in response to the trigger operation. A reminding function of losing the device and a connection function are provided based on the reminder button. The reminding of losing the device (the reminder button) may be clicked, and an SMS or a WeChat message having location information may be sent to the person who lost the device, assisting the person to get back the device. When the device that accesses the terminal is not the device of the user of the terminal, the device that accesses the terminal is different, and the recommendation area and the recommendation information of the displaying interface are shown in FIG. 10.

When a device of a person, who is not the user the terminal, accesses the terminal, information of the accessing device is displayed based on device information of the accessing device, and recommendation information of the device of another user is generated. The recommendation information only involves operation recommendation, but does not involve content recommendation or application recommendation. It can be understood that before the information of the accessing device is displayed, it is confirmed whether the reminder button is operated. When the reminder button is operated, a reminding message is sent based on user information in the device information. After the reminding message is sent, the device information of the device that accesses the terminal is then displayed, allowing the device to be used more securely.

In an embodiment, after the device information of the device that accesses the terminal is obtained, a user of the device is identified. The type of recommendation is determined based on the identified user of the device. Different recommendation information are required for devices of different users, such that accurate information recommendation can be made.

In this embodiment, when the device of the person, who is not the user the terminal, accesses the terminal, the reminder button and the reminding function are provided, enabling the person to get back the device, preventing the device from being lost.

In an embodiment, the device that currently accesses the terminal does not belong to the user of the accessed terminal, authorization information of the user of the terminal is determined. The target recommendation information is generated based on the authorization information and the device information of the device that accesses the terminal. An operation recommendation information displayed in the recommendation area may be firstly determined customizedly based on the type of the device. The operation recommendation information is an operation that is supported by the terminal, authorized by the user of the terminal, provided after the user authorization to ensure security of using the terminal, and is based on the accessing device. For example, the operation may be a reminding operation, a mobile phone remote control operation, and so on. Since the operation is authorized and is supported by the terminal, the security of the terminal is ensured, the terminal may be used safely, and information leakage may be avoided.

Figure 11:
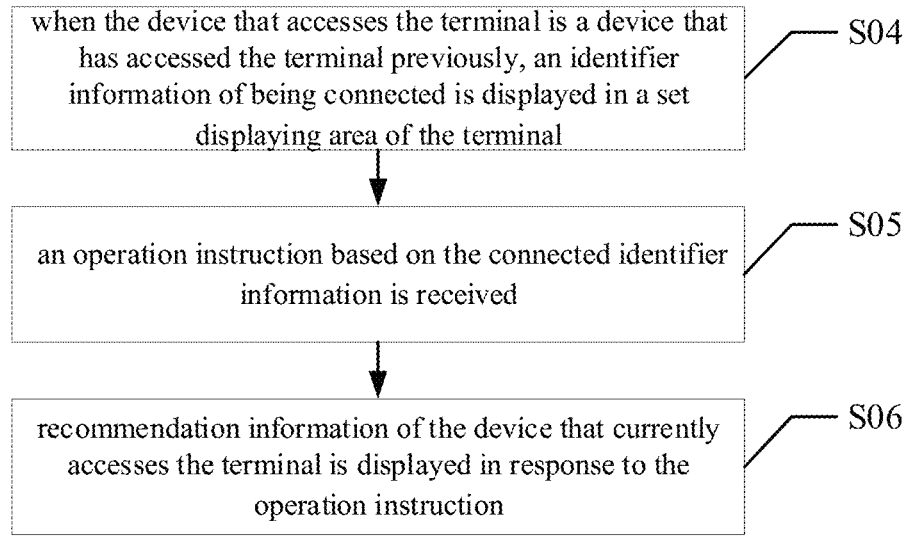
FIG. 11 is a flow chart of a method of controlling display of terminal information according to still another embodiment of the present disclosure.

In an embodiment, as shown in FIG. 11, after the device information of the device that currently accesses the terminal is obtained, the method further includes the following.

In an operation S04, when the device that accesses the terminal is a device that has accessed the terminal previously, an identifier information of being connected is displayed in a set displaying area of the terminal.

In an operation S05, an operation instruction based on the connected identifier information is received.

In an operation S06, recommendation information of the device that currently accesses the terminal is displayed in response to the operation instruction.

Figure 12:
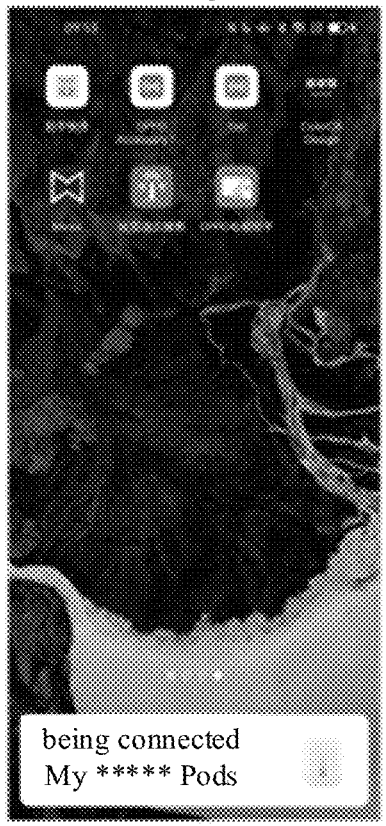
FIG. 12 is a schematic view of connection reminding information showing a device that has accessed the terminal previously according to an embodiment of the present disclosure.
Figure 13:
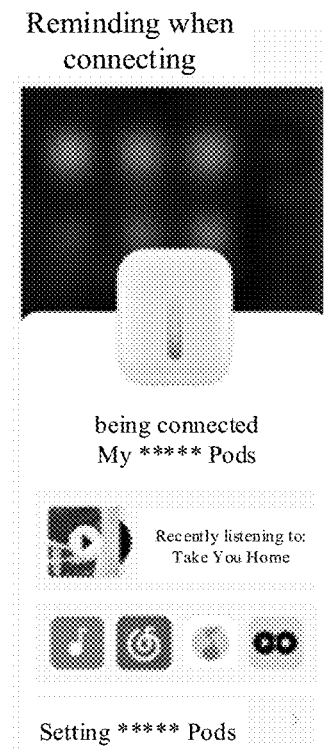
FIG. 13 is a schematic view of an expanded connection pop-up window of a device that has accessed the terminal previously according to an embodiment of the present disclosure.

When the device is not connected to the terminal for the first time, the bound device will automatically re-connect to the terminal based on a location or an operation of the user. After the bound device re-connects to the terminal, the recommendation information is displayed in the recommendation area. While the bound device is re-connecting to the terminal, an identifier information of being connected is displayed. The identifier information of being connected may be a pop-up window at a bottom of the display screen of the terminal indicating the device information of a connected device, as shown in FIG. 12. The user clicks or swipe up the identifier information of being connected, the pop-up window of the connected device may be expanded as shown in FIG. 13. A list of services are provided in the pop-up window, and the pop-up window includes a plurality of recommendation areas, such as: a content recommendation area, providing content that is most recently used and matches the device; an application recommendation area, providing an application that is downloaded in the mobile phone and matches the device; and more operations (an operation recommendation area), providing an interface allowing the device to access the terminal.

In this embodiment, the identifier information of being connected is displayed when the device that has previously accessed the terminal accesses the terminal again, to display the recommendation information in the recommendation area. In this way, simpler operations may be performed, recommendation information may not be generated for recommendations. Computing resources are saved, while simpler operations can be performed.

Figure 14:
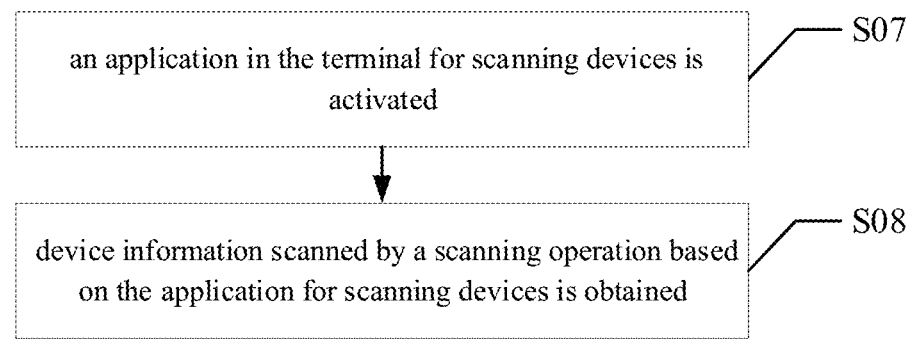
FIG. 14 is a flow chart of a method of controlling display of terminal information according to still another embodiment of the present disclosure.

In an embodiment, as shown in FIG. 14, the method further includes the following.

In an operation S07, an application in the terminal for scanning devices is activated.

In an operation S08, device information scanned by a scanning operation based on the application for scanning devices is obtained.

Figure 15:
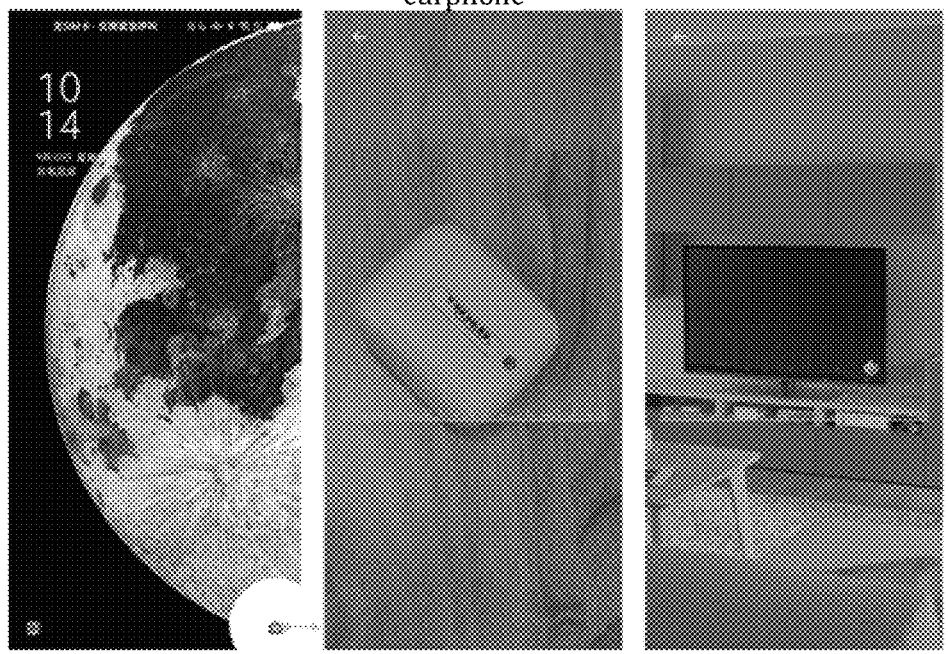
FIG. 15 is a schematic view of scanning an accessing device according to an embodiment of the present disclosure.

In the art, a device may be identified by shaking or NFC touching, and device information and images of the identified device may be obtained. However, in this embodiment, the device may be identified by scanning. By "scanning", a device scanning application in the terminal, such as a camera, is activated, and the device may be identified quickly without touching. The camera of the mobile phone may face towards the device, and the identification may be started. A mobile phone application that includes the camera, such as the camera application and a scanning application, is shown in FIG. 15. When the camera determines that the camera faces only one device and finds an exclusive identification code on the device, a device identification mode may be activated automatically. Otherwise, a normal camera or a scanning function may be started. About the exclusive identification code, based on the QR code technology, all information of the device is stored, the QR code is placed on a surface of the device, such that the QR code can be scanned easily. After the QR code is scanned and the device information is obtained, the device accesses the terminal automatically. The device may access the terminal wirelessly. The operations may be simple. The device may be identified and access the terminal by scanning the image and/or the identification code, the device may access the terminal, and data interaction is completed.

Understandably, when the device is being identified, images and the identification code may be combined for identifying the device. The device can be identified based on images, and the type of the device, the model of the device, and belonging of the device can be identified based on the identification code. The combination allows the device to be identified more accurately, and the device information can be obtained.

In this embodiment, a new device accessing method is provided. The device can access the terminal without any manual inputting operation. Operations of accessing the device to the terminal may be simple.

In an embodiment, in order to better describe the present embodiment, the method further includes the following.

A method of identifying the device to access the terminal:

The device can be identified by being scanned by the camera, such that the device can be identified without being touched. The camera of the mobile phone faces the device to start the identification. The applications including the camera includes, such as the camera application, the scanning application, as shown in FIG. 15. When the camera determines that the camera is currently facing only one device and finds an exclusive identification code on the device, a device identification mode may be activated automatically. Otherwise, a normal camera or a scanning function may be started. About the exclusive identification code, based on the QR code technology, all information of the device is stored, the QR code is placed on a surface of the device, such that the QR code can be scanned easily.

A method of identifying a new device:

After the device is identified, a device connection card is automatically evoked, and binding information of the device is firstly obtained. When the device is the new device, provided services (recommendation information in the recommendation area) are shown in FIG. 16. FIG. 16 includes FIG. 16-1 showing adding a headset and FIG. 16-2 showing adding a TV.

The device is automatically added to a binding device list of the user of the mobile terminal. Images and a type of the device are obtained. A mobile phone information is generated to form a recommendation content list of the current device. As shown in FIGS. 16-1 and FIG. 16-2, the recommendation content list includes three areas.

1. Content Recommendation Area:

In this area, content that matches the current device and can be used by the current device is provided, and the content is recently used by the user. As shown in FIG. 16-1, the device is a headphone, songs are provided to match the headphone, and the songs are recently played by the user. As shown in FIG. 16-2, the device is a TV, videos and audios are provided to match the TV, and the videos and the audios are recently watched by the user.

2. Application Recommendation Area:

In this area, an application that matches and can be used by the current device is provided, and the application is already downloaded to the mobile phone. Even when applications are scattered in different interfaces of the mobile phone, the applications are reorganized by using the device, allowing the user to use the application directly instead of having to manually searching for the application.

3. More Operations (Operation Recommendation Information):

In this area, an entry for controlling the new device is provided. As shown in FIG. 16-1, when the new device is the headphone, an entry for setting the headphone is provided. As shown in FIG. 16-2, when the new device is the TV, an entry for mobile phone remote controlling is provided.

For the device that accesses the terminal belongs to a user other than the user of the terminal:

After the device is identified, and when the device belongs to user other than the user of the terminal, provided services (recommendation information in the recommendation area) are shown in FIG. 17.

Information of the owner of the device is displayed. An image and a type of the device are obtained and forms a recommendation content list of the current device, as shown in FIG. 17. The recommendation content list may support as many operations as possible and may be customized based on the type of the device. The operations in the recommendation content list must be supported by the current mobile phone and authorized by the user. As shown in FIG. 17, the user may scan a headset, and the headset may be lost by or borrowed from another person. In this case, a function of reminding the headset being lost and a connection function are provided. The function of reminding the headset being lost may be clicked to send a text message having location information to the owner of the headset, assisting the owner to get back the device.

The device that has bound to the terminal is re-connected to the terminal. As shown in FIG. 18, FIG. 18 includes FIG. 18-1 showing a remind of the device that has bound to the terminal being re-connected to the terminal and FIG. 18-2 showing the pop-up window being expanded when the device is re-connecting to the terminal.

When the device is not connected to the terminal for the first time, the bound device will automatically re-connect to the terminal based on a location or an operation of the user. After the bound device re-connects to the terminal, the recommendation information is displayed in the recommendation area. While the bound device is re-connecting to the terminal, an identifier information of being connected is displayed. The identifier information of being connected may be a pop-up window at a bottom of the display screen of the terminal indicating the device information of a connected device, as shown in FIG. 18-1. The user clicks or swipe up the identifier information of being connected, the pop-up window of the connected device may be expanded as shown in FIG. 18-2. A list of services are provided in the pop-up window, and the pop-up window includes a plurality of recommendation areas, such as: a content recommendation area, providing content that is most recently used and matches the device; an application recommendation area, providing an application that is downloaded in the mobile phone and matches the device; and more operations (an operation recommendation area), providing an interface allowing the device to access the terminal.

The present disclosure provides a device of controlling display of terminal information, as shown in FIG. 19, the device includes an obtaining module 10, a determination module 20, and a displaying module 30.

The obtaining module 10 is configured to obtain device information of a device that currently accesses the terminal.

The determination module 20 is configured to determine target recommendation information based on the device information, and the target recommendation information is recommendation information corresponding to the device that currently accesses the terminal.

The displaying module 30 is configured to display the target recommendation information in a recommendation area in a display area of the terminal, and different recommendation areas correspondingly display different target recommendation information.

Figure 20:
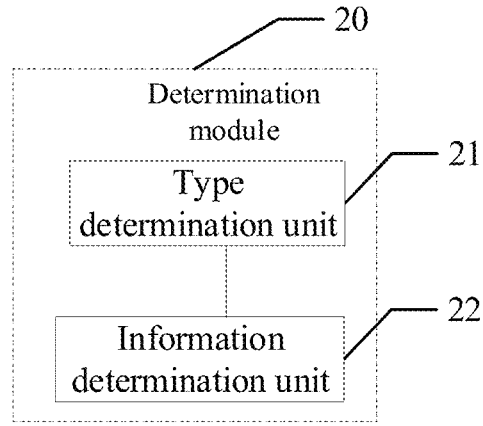
FIG. 20 is a detailed structural diagram of a determination module 20 according to an embodiment of the present disclosure.

Further, as shown in FIG. 20, the determination module 20 includes a type determination unit 21 and an information determination unit 22.

The type determination unit 21 is configured to determine a recommendation type of the recommendation information based on the device information.

The information determination unit 22 is configured to determine a target recommendation information of each of various recommendation types based on the determined recommendation type, and target recommendation information of the various recommendation types are displayed in different recommendation areas.

Further, the information determination unit 22 is further configured to determine a target content recommendation information based on the device information when the recommendation area is a first recommendation area, and the content recommendation information corresponds to a content browsing history of the terminal.

The information determination unit 22 is further configured to determine a target application recommendation information based on the device information when the recommendation area is a second recommendation area, and the application recommendation information corresponds to the usage history of the application used by the user of the terminal.

The information determination unit 22 is further configured to determine a target operation recommendation information based on the device information when the recommendation area is a third recommendation area, and the operation recommendation information corresponds to an operation history performed by the user of the terminal.

Further, the information determination unit 22 is further configured to determine the target application recommendation information based on the device information when the recommendation area is the second recommendation area, and the target application information is loaded in various interfaces of the terminal before being generated.

Figure 21:
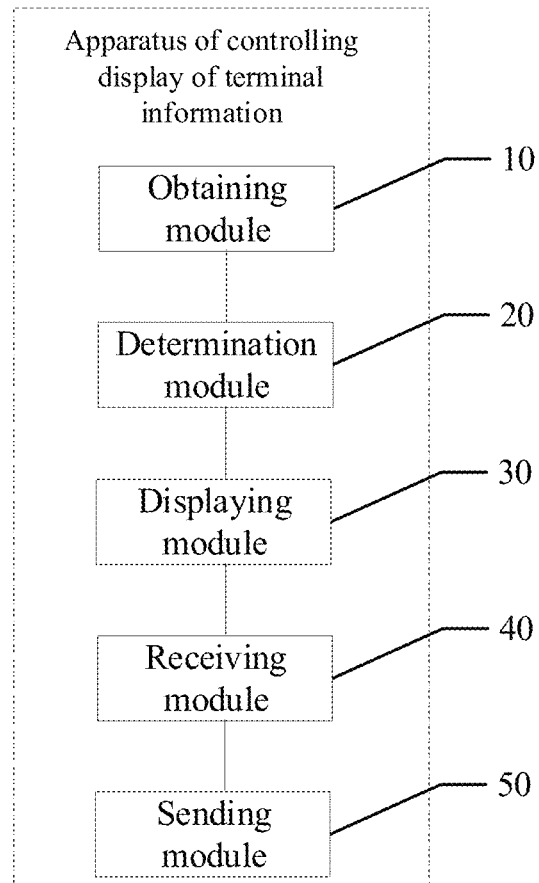
FIG. 21 is a structural diagram of a device of controlling display of terminal information according to another embodiment of the present disclosure.

Further, as shown in FIG. 21, the device further includes: a receiving module 40 and a sending module 50.

When the device that accesses the terminal is a device belonging to the user of the terminal, the determination module 20 is configured to determine target recommendation information based on the device information.

The displaying module 30 is further configured to display a reminder button in a predetermined area of the terminal when the device that currently accesses the terminal is not the device of the user of the terminal.

The receiving module 40 is configured to receive a trigger operation based on the reminder button.

The sending module 50 is configured to send a reminding message to a user of the device that accesses the terminal in response to the trigger operation.

The information determination unit 22 is further configured to determine authorization information of the user of the terminal when the device that accesses the terminal is not the device of the user of the terminal.

The information determination unit 22 is further configured to generate the target recommendation information based on the authorization information and the device information of the device that accesses the terminal.

Further, the displaying module 30 is further configured to display an identifier information of being connected in a set displaying area of the terminal when the device that accesses the terminal is a device that has accessed the terminal previously.

The receiving module 40 is further configured to receive an operation instruction based on the identifier information of being connected.

The displaying module 30 is further configured to display recommendation information of the device that accesses the terminal in response to the operation instruction.

Figure 22:
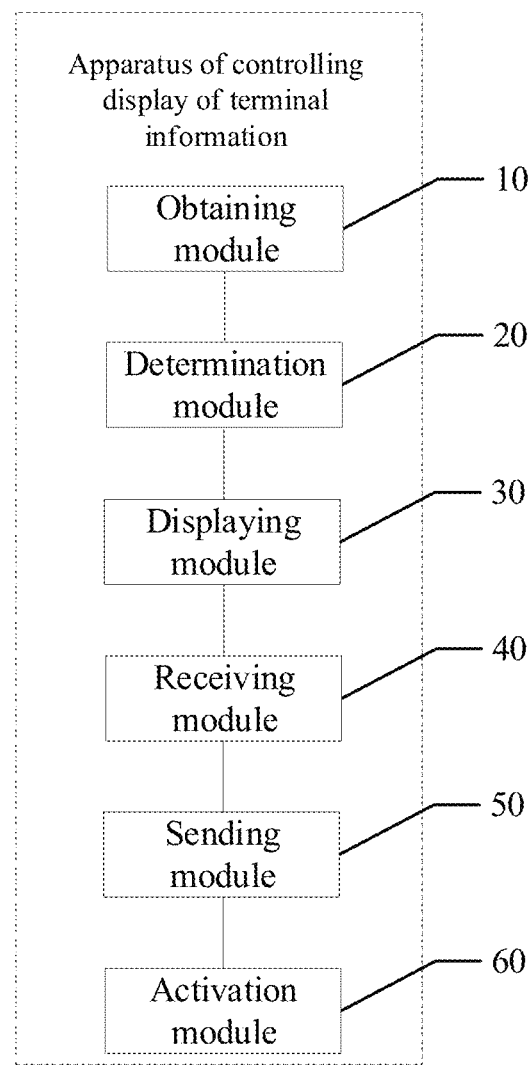
FIG. 22 is a structural diagram of a device of controlling display of terminal information according to still another embodiment of the present disclosure.

Further, as shown in FIG. 22, the device further includes an activation module 60.

The activation module 60 is configured to activate an application in the terminal for scanning devices.

Further, the obtaining module 10 is further configured to obtain device information scanned by a scanning operation based on the application for scanning devices.

Further, the obtaining module 10 is further configured to obtain image information of the device based on the scanning operation of the application for scanning devices; and to obtain the device information by recognizing the image information.

The present disclosure provides a terminal, including a memory, a processor and a computer program stored in the memory and run on the processor. The processor executes the computer program to perform following operations.

Device information of a device that currently accesses the terminal is obtained.

Target recommendation information is determined based on the device information, and the target recommendation information is recommendation information corresponding to the device that currently accesses the terminal.

The target recommendation information is displayed in a recommendation area in a display area of the terminal, and different recommendation areas correspondingly display different target recommendation information.

The terminal is arranged with a processor, a communication module connected to the processor, a display screen connected to the processor, and a camera module connected to the processor. The processor scans and identifies the device through the camera module. The identified device accesses the terminal. The processor processes and generates the recommendation information of the terminal based on the device information of the device that accesses the terminal. The generated recommendation information matching the accessing device is displayed in the corresponding recommendation area of the terminal. The performs the operation or controls the accessing device based on the recommendation information. In this way, operation content of the device that accesses the terminal may be provided automatically, the user does not have to manually search the operation content. Operations are simple, and the intelligence of the terminal is improved.

The present disclosure further provides a computer readable storage medium on which a computer program is stored, and the computer program may be executed by a processor to perform the following operations.

Device information of a device that currently accesses the terminal is obtained.

Target recommendation information is determined based on the device information, and the target recommendation information is recommendation information corresponding to the device that currently accesses the terminal.

The target recommendation information is displayed in a recommendation area in a display area of the terminal, and different recommendation areas correspondingly display different target recommendation information.

It should be understood by any ordinary skilled person in the art that, embodiments of the present disclosure may be provided as a method, a system, or a computer program product. The present disclosure may take the form of a completely hardware embodiment, a completely software embodiment, or an embodiment combining software and hardware aspects. Further, the present disclosure may take the form of a computer program product implemented on one or more computer-usable storage media (including, but not limited to, a disk memory, a CD-ROM, an optical memory, and so on) containing computer-usable program codes.

The present disclosure is described by referring to flow charts and/or block diagrams of methods, devices (systems), and computer program products according to embodiments of the present disclosure. It is to be understood that each process and/or block in the flow chart and/or in the block diagram, and the combination of processes and/or blocks in the flow chart and/or in the block diagram, may be implemented by computer program instructions. These computer program instructions may be provided to a processor of a general purpose computer, a dedicated computer, an embedded processor or other programmable data processing device to produce a machine, such that instructions executed by the processor of the computer or other programmable data processing device produce a device for implementing the functions specified in one or more processes of the flow chart and/or one or more blocks of the block diagram.

These computer program instructions may also be stored in a computer readable memory capable of directing a computer or other programmable data processing device to operate in a particular manner, such that the instructions stored in such computer readable memory produce an article of manufacture including an instruction device that implements the function specified in one or more processes of the flow chart and/or one or more blocks of the block diagram.

These computer program instructions may also be loaded onto a computer or other programmable data processing device such that a series of operations are executed on the computer or other programmable device to produce computer-implemented processing, such that the instructions executed on the computer or other programmable device provide operations for implementing the functions specified in one or more processes of the flow chart and/or one or more blocks of the block diagram.

It should be noted that any reference symbol within brackets in a claim shall not be interpreted as a limitation of the claim. The word "comprising" does not exclude existence of parts or steps that are not listed in the claim. The word "a" or "one" before a component does not exclude existence of a plurality of such components. The present disclosure can be implemented with the aid of hardware having a number of different components and with the aid of a computer that is suitably programmed. In a claim of a unit that lists a number of devices, several of these devices may be embodied by one hardware item. The terms of first, second, third, and so on, does not indicate any order. The words may be interpreted as names.

Although optional embodiments of the present disclosure are described, any ordinary skilled person in the art may make additional changes and modifications to these embodiments once basic inventive concepts are known. Therefore, the appended claims are intended to be interpreted as including the optional embodiments and all changes and modifications that fall within the scope of the present disclosure.

Apparently, any ordinary skilled person in the art can make various changes and variations to the present disclosure without departing from the spirit and scope of the present disclosure. Therefore, when such modifications and variations fall within the scope of the claims and technical equivalents of the claims of the present disclosure, the modifications and variations shall be included in the present disclosure.

What is claimed is:

1. A method of controlling display of terminal information, comprising:
   obtaining device information of a device that accesses a terminal;
   determining target recommendation information based on the device information, wherein the target recommendation information is recommendation information corresponding to the device that currently accesses the terminal; and
   displaying the target recommendation information in a recommendation area in a display area of the terminal, wherein different recommendation areas correspondingly display different target recommendation informations;
   wherein, the target recommendation information comprises: a target content recommendation information, which is determined from a content browsing history of the terminal; a target application recommendation information, which is determined from a usage history of applications used by a user of the terminal; and a target operation recommendation information, which is determined from an operation history performed by the user of the terminal;
   wherein, after the obtaining device information of a device that accesses a terminal, further comprising:
   performing the operation of determining the target recommendation information based on the device information in response to the device that accesses the terminal being a device belonging to the user of the terminal;
   displaying a reminder button in a predetermined area of the terminal in response to the device that accesses the terminal being not the device belonging to the user of the terminal; and
   receiving a trigger operation based on the reminder button, sending a reminding message to a user of the device that accesses the terminal in response to the trigger operation.

2. The method according to claim 1, wherein the determining target recommendation information based on the device information, comprises:
   determining a recommendation type of the recommendation information based on the device information; and
   determining a target recommendation information of the recommendation type based on the determined recommendation type, wherein target recommendation informations of the various recommendation types are displayed in different recommendation areas.

3. The method according to claim 1, wherein the determining target recommendation information based on the device information, comprises at least one of the following:
   determining the target content recommendation information based on the device information in response to a recommendation area being a first recommendation area, wherein the content recommendation information corresponds to the content browsing history of the terminal;
   determining the target application recommendation information based on the device information in response to the recommendation area being a second recommendation area, wherein the application recommendation information corresponds to the usage history of applications used by a user of the terminal;
   or
   determining the target operation recommendation information based on the device information in response to the recommendation area being a third recommendation area, wherein the operation recommendation information corresponds to the operation history performed by the user of the terminal.

4. The method according to claim 3, wherein the determining a target application recommendation information based on the device information in response to the recommendation area being a second recommendation area, comprises:
determining the target application recommendation information from all applications supported by the terminal based on the device information in response to the recommendation area being the second recommendation area, wherein the target application information is loaded in various interfaces of the terminal before being generated.

5. The method according to claim 1, further comprising:
determining authorization information of the user of the terminal in response to the device that accesses the terminal being not the device belonging to the user of the terminal; and
generating the target recommendation information based on the authorization information and the device information of the device that accesses the terminal.

6. The method according to claim 1, after the obtaining device information of a device that accesses a terminal, further comprising:
displaying an identifier information of being connected in a set displaying area of the terminal in response to the device that accesses the terminal is a device that has accessed the terminal previously;
receiving an operation instruction based on the identifier information of being connected; and
displaying recommendation information of the device that accesses the terminal in response to the operation instruction.

7. The method according to claim 1, further comprising:
activating a scanning application in the terminal for scanning devices; and
obtaining device information scanned by a scanning operation based on the scanning application.

8. The method according to claim 7, wherein the obtaining device information scanned by a scanning operation based on the scanning application, comprises:
obtaining image information of the device based on the scanning operation of the scanning application; and
performing recognition operation on the image information to obtain the device information.

9. A terminal, comprising a memory, a processor and a computer program stored in the memory and runnable on the processor, wherein the processor is configured to execute the computer program to perform operations of:
obtaining device information of a device that accesses a terminal;
determining target recommendation information based on the device information, wherein the target recommendation information is recommendation information corresponding to the device that currently accesses the terminal; and
displaying the target recommendation information in a recommendation area in a display area of the terminal, wherein different recommendation areas correspondingly display different target recommendation informations;

after obtaining device information of the device that accesses the terminal, the processor is further configured to execute the computer program to perform operations of:
performing the operation of determining the target recommendation information based on the device information in response to the device that accesses the terminal being a device belonging to the user of the terminal;
displaying a reminder button in a predetermined area of the terminal in response to the device that accesses the terminal being not the device belonging to the user of the terminal; and
receiving a trigger operation based on the reminder button, sending a reminding message to a user of the device that accesses the terminal in response to the trigger operation.

10. The terminal according to claim 9, wherein while determining the target recommendation information based on the device information, the processor is further configured to execute the computer program to perform operations of:
determining a recommendation type of the recommendation information based on the device information; and
determining a target recommendation information of the recommendation type based on the determined recommendation type, wherein target recommendation informations of the various recommendation types are displayed in different recommendation areas.

11. The terminal according to claim 9, wherein while determining the target recommendation information based on the device information, the processor is further configured to execute the computer program to perform at least one of the following operations:
determining a target content recommendation information based on the device information in response to a recommendation area being a first recommendation area, wherein the content recommendation information corresponds to a content browsing history of the terminal;
determining a target application recommendation information based on the device information in response to the recommendation area being a second recommendation area, wherein the application recommendation information corresponds to a usage history of applications used by a user of the terminal;
or
determining a target operation recommendation information based on the device information in response to the recommendation area being a third recommendation area, wherein the operation recommendation information corresponds to an operation history performed by the user of the terminal.

12. The terminal according to claim 11, wherein while determining the target application recommendation information based on the device information in response to the recommendation area being the second recommendation area, the processor is further configured to execute the computer program to perform operations of:
determining the target application recommendation information from all applications supported by the terminal based on the device information in response to the recommendation area being the second recommendation area, wherein the target application information is loaded in various interfaces of the terminal before being generated.

13. The terminal according to claim 9, wherein the processor is further configured to execute the computer program to perform operations of:

determining authorization information of the user of the terminal in response to the device that accesses the terminal being not the device belonging to the user of the terminal; and generating the target recommendation information based on the authorization information and the device information of the device that accesses the terminal.

14. The terminal according to claim 9, wherein, after obtaining device information of the device that accesses the terminal, the processor is further configured to execute the computer program to perform operations of:

displaying an identifier information of being connected in a set displaying area of the terminal in response to the device that accesses the terminal is a device that has accessed the terminal previously;

receiving an operation instruction based on the identifier information of being connected; and displaying recommendation information of the device that accesses the terminal in response to the operation instruction.

15. The terminal according to claim 9, wherein the processor is further configured to execute the computer program to perform operations of:

activating a scanning application in the terminal for scanning devices; and obtaining device information scanned by a scanning operation based on the scanning application.

16. The terminal according to claim 15, wherein while obtaining device information scanned by the scanning operation based on the scanning application, the processor is further configured to execute the computer program to perform operations of:

obtaining image information of the device based on the scanning operation of the scanning application; and performing recognition operation on the image information to obtain the device information.

17. A non-transitory computer readable storage medium, wherein a computer program is stored in the computer readable storage medium, and the computer program is executed by a processor to perform operations of:

obtaining device information of a device that accesses a terminal;

determining target recommendation information based on the device information, wherein the target recommendation information is recommendation information corresponding to the device that currently accesses the terminal; and displaying the target recommendation information in a recommendation area in a display area of the terminal, wherein different recommendation areas correspondingly display different target recommendation informations;

after obtaining device information of the device that accesses the terminal, the computer program is executed by a processor to perform operations of:

performing the operation of determining the target recommendation information based on the device information in response to the device that accesses the terminal being a device belonging to the user of the terminal;

displaying a reminder button in a predetermined area of the terminal in response to the device that accesses the terminal being not the device belonging to the user of the terminal; and receiving a trigger operation based on the reminder button, sending a reminding message to a user of the device that accesses the terminal in response to the trigger operation.

18. The non-transitory computer readable storage medium according to claim 17, wherein while determining target recommendation information based on the device information, the computer program is further executed by the processor to perform operations of:

determining a recommendation type of the recommendation information based on the device information; and determining a target recommendation information of the recommendation type based on the determined recommendation type, wherein target recommendation informations of the various recommendation types are displayed in different recommendation areas.

\* \* \* \* \*